United States Patent
Seo et al.

(10) Patent No.: US 7,414,993 B2
(45) Date of Patent: Aug. 19, 2008

(54) INTELLIGENT CHANNEL SELECTION APPARATUS AND METHOD AGAINST VARIOUS INTERFERERS IN WIRELESS COMMUNICATION SYSTEMS AND RECEIVER USING THE SAME

(75) Inventors: Hae-Moon Seo, Young-In (KR); Yong-Kuk Park, Seoul (KR); Kwang-Ho Won, Yong-In (KR); June-Jae Yoo, Seoul (KR)

(73) Assignee: Korea Electronics Technology Institute, Kyunggi-Do (KR)

( * ) Notice: Subject to any disclaimer, the term of this patent is extended or adjusted under 35 U.S.C. 154(b) by 807 days.

(21) Appl. No.: 10/874,533

(22) Filed: Jun. 24, 2004

(65) Prior Publication Data
US 2005/0226269 A1    Oct. 13, 2005

(30) Foreign Application Priority Data
Apr. 9, 2004    (KR) ............... 10-2004-0024284

(51) Int. Cl.
*H04B 1/26* (2006.01)
(52) U.S. Cl. ............. 370/332; 370/334; 370/485; 370/481
(58) Field of Classification Search ............ 455/450, 455/464, 509, 513; 370/329, 437, 318, 332, 370/334, 485, 481, 341, 349
See application file for complete search history.

(56) References Cited

U.S. PATENT DOCUMENTS

| | | | |
|---|---|---|---|
| 6,175,739 B1 | 1/2001 | Ishii et al. | |
| 6,636,738 B1 | 10/2003 | Hayashi | |
| 6,760,599 B1 * | 7/2004 | Uhlik | 455/525 |
| 6,927,728 B2 * | 8/2005 | Vook et al. | 342/377 |
| 2002/0051433 A1 * | 5/2002 | Affes et al. | 370/335 |
| 2003/0181211 A1 * | 9/2003 | Razavilar et al. | 455/450 |
| 2004/0081256 A1 * | 4/2004 | Shi et al. | 375/317 |

FOREIGN PATENT DOCUMENTS

| | | |
|---|---|---|
| EP | 1028564 A1 * | 8/2000 |
| KR | 2003-0017618 A | 3/2003 |
| WO | WO 02/093839 A2 | 11/2002 |

\* cited by examiner

*Primary Examiner*—Ricky Ngo
*Assistant Examiner*—DeWanda Samuel
(74) *Attorney, Agent, or Firm*—Edell, Shapiro & Finnan, LLC

(57) ABSTRACT

Disclosed herein is an intelligent channel selection apparatus and method against various interferers in wireless communication systems, and a receiver using the same. The intelligent channel selection apparatus includes a channel power measurement unit, a channel list storage unit, a channel selection data generation unit and a channel selection unit. The channel power measurement unit measures received signal channel power of a plurality of available channels and storing the received signal channel power as channel power data. The channel list storage unit arranges the plurality of available channels and storing the plurality of available channels in a channel list. The channel selection data generation unit generates data for channel selection based on the signal channel power data and the frequency offsets of the channels of the channel list. The channel selection unit selects the highest priority channel from the channel list based on the data for channel selection.

14 Claims, 6 Drawing Sheets

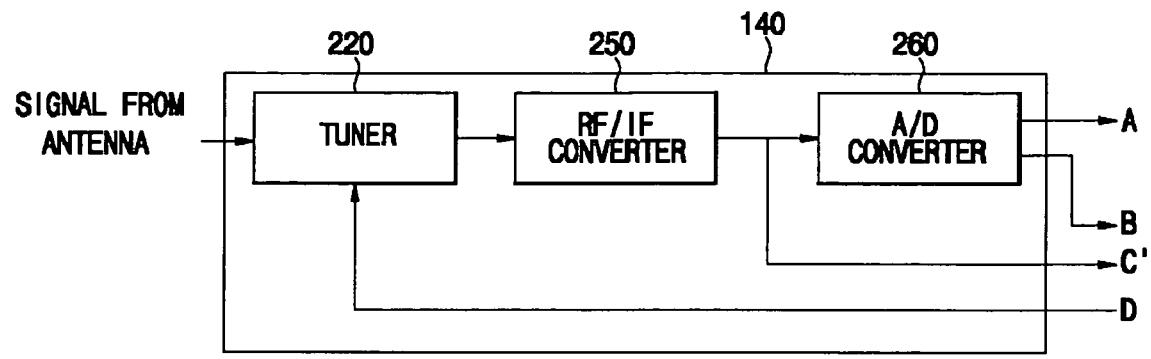
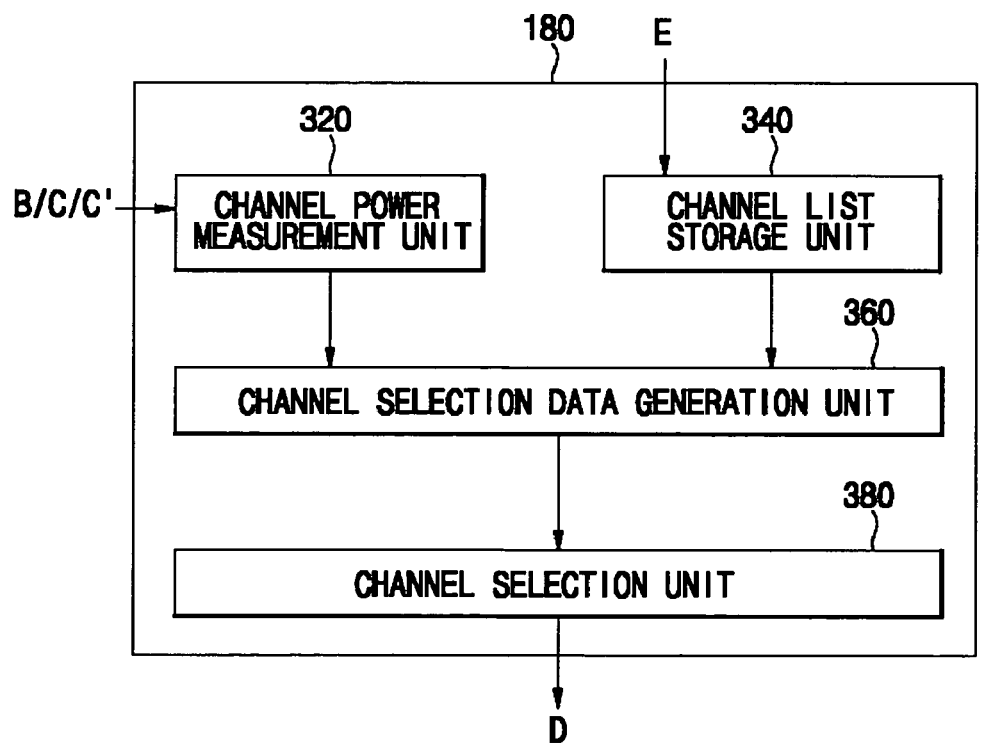

INTELLIGENT CHANNEL SELECTION APPARATUS AND METHOD AGAINST VARIOUS INTERFERERS IN WIRELESS COMMUNICATION SYSTEMS AND RECEIVER USING THE SAME

BACKGROUND OF THE INVENTION

1. Field of the Invention

The present invention relates generally to an intelligent channel selection system and method against various interferers in wireless communication systems and, more particularly, to an intelligent channel selection system and method, which generates data for channel selection based on frequency offsets and signal channel power and assigns a channel based on the data for channel selection so as to achieve out-of-band channel selection against various interferers in the industrial, scientific and medical band.

2. Description of the Related Art

A variety of mechanisms capable of solving general coexistence problems in the Industrial, Scientific and Medical (ISM) band have been proposed. In particular, for channel selection methods in the ISM band in which various communication systems supporting various communication standards, in particular, a Wireless Local Area Network (WLAN), Bluetooth and Radio Frequency IDentification (RFID), exist, there are in-band channel selection methods and out-of-band channel selection methods.

The in-band channel selection methods are used to fulfill a desired Packet Error Rate (PER) by reducing the degradation of a signal-to-noise ratio caused by in-band channel interferers, and the out-of-band channel selection methods are used to reduce the degradation of a signal-to-noise ratio caused by out-of-band channel interferers. Furthermore, appropriate channel selection reduces the Minimum Detectable Signal (MDS) of a receiver, thus considerably reducing power consumption through a receiver power control loop and, consequently, increasing the life span of a battery.

For example, in Institute of Electrical and Electronics Engineers (IEEE) 802.15.4 specifications (refer to IEEE Standard 802.15.4-2003 Annex-E pp. 637~640), there are disclosed in-band channel selection methods, such as Channel Clear Assessment (CCA) and ED/LQI (Energy Detection/Link Quality Indication), and out-of-channel selection methods, such as Dynamic Channel Selection (DCS), Channel Alignment (CA) and Neighbor Pico-net Capability (NPC).

However, in the case where interferers of various sizes exist in the ISM-band in which various communication systems exist, channel selection/assignment should be performed carefully in terms of a minimum detectable signal and power consumption.

For example, the above-described DCS proposed in IEEE 802.15.4 specification is a frequency non-overlapping method, the efficiency of which decreases as the number of interferers increases.

U.S. Unexamined Pat. Publication No. 2003/0181211, which was filed by Razavilar et al., published on Sep. 25, 2003 and entitled "Method and apparatus for dynamic channel selection in wireless modems," discloses the DCS in which signal channel power is measured based on Received Signal Strength Indication (RSSI), lowest signal channel power is found out and the channel of the lowest signal channel power is assigned. Furthermore, when co-channel signaling exists, channel assigning is performed with the co-channel signaling being taken into consideration.

However, Razavilar el al.'s patent application does not consider the influence of frequency offsets. When neighboring strong interferers exist, the influence of frequency offsets should be considered more than signal channel power, but Razavilar el al.'s patent does not disclose the influence of frequency offsets.

Korean Unexamined Pat. publication No. 2003-0017618, which was filed by Koninklijke Philips Electronics N.V., published on Mar. 3, 2003 and entitled "dynamic frequency selection mechanism for IEEE 802.11 WLAN," discloses a scheme of selecting a channel based on Clear Channel Assessment (CCA) and RSSI, which does not consider the influence of frequency offsets.

The above-described conventional technologies are dynamic channel selection methods based on RSSI, and have no provision for selecting a channel while considering the influence of frequency offsets as well as RSSI. When a channel is selected using RSSI without the consideration of frequency offsets notwithstanding that frequency offsets have influence greater than that of the signal channel power when strong interferers exist nearby, various defects arise.

In the ISM-band in which various communication systems exist, systems based on different communication standards as well as a system based on a communication standard that a user uses may exist. The biggest problem in such a frequency band is the existence of interferers. Such interferers actually influence CSA at the communication standard that the user uses.

In this case, if inappropriate CSA is performed, a problem arises in that the minimum detectable signal of a receiver and power consumption are increased due to Inter-Modulation Distortion (IMD) and reciprocal mixing effects caused by stronger interferers in surrounding channels.

Accordingly, a method of reducing a minimum detectable signal and power consumption by decreasing the influence of interferers under the same frequency channel environments is required.

SUMMARY OF THE INVENTION

Accordingly, the present invention has been made keeping in mind the above problems occurring in the prior art, and an object of the present invention is to provide an intelligent channel selection apparatus and method against various interferers in wireless communication systems, which is capable of reducing the influence of interferers, thus reducing a minimum detectable signal and power consumption.

Another object of the present invention is to provide a receiver using an intelligent channel selection apparatus and method against various interferers in wireless communication systems.

In order to accomplish the above object, the present invention provides an intelligent channel selection apparatus against various interferers in wireless communication systems, including a channel power measurement unit measuring received signal channel power of a plurality of available channels and storing the received signal channel power as channel power data; a channel list storage unit arranging the plurality of available channels and storing the plurality of available channels in a channel list; a channel selection data generation unit generating data for channel selection based on the signal channel power data and the frequency offsets of the channels of the channel list; and a channel selection unit selecting the highest priority channel from the channels of the channel list based on the data for channel selection.

In addition, the present invention provides an intelligent channel selection method against various interferers in wireless communication systems, including arranging a plurality of available channels and storing the plurality of available channels in a channel list; measuring received channel power with respect to the plurality of available channels and storing the received signal channel power as signal channel power data; generating data for channel selection based the signal channel power and frequency offsets of channels of the channel list; and selecting a highest priority channel from the channels of the channel list based on the data for channel selection.

In addition, the present invention provides a receiver for wireless communication systems having an antenna receiving a radio signal, a low noise amplifier amplifying the radio signal received from the antenna, a frequency synthesizer generating a plurality of frequencies, a mixer mixing a signal amplified by the low noise amplifier and an output frequency of the frequency synthesizer, a low-pass filter and PGA unit performing low-pass filtering on an output signal of the mixer and programmable gain amplification on the filtered signal, an A/D converter converting an output signal of the low-pass filter and PGA unit, a demodulation unit demodulating an output signal of the A/D converter, and an intelligent channel selection apparatus performing channel selection, the intelligent channel selection apparatus including a channel power measurement unit measuring received signal channel power of a plurality of available channels and storing the received signal channel power as channel power data; a channel list storage unit arranging the plurality of available channels and storing the plurality of available channels in a channel list; a channel selection data generation unit generating data for channel selection based on the signal channel power data and frequency offsets of channels of the channel list; and a channel selection unit selecting a highest priority channel from the channels of the channel list based on the data for channel selection.

BRIEF DESCRIPTION OF THE DRAWINGS

The above and other objects, features and advantages of the present invention will be more clearly understood from the following detailed description taken in conjunction with the accompanying drawings, in which:

FIGS. 2a and 2b are block diagrams of RF modules of receivers equipped with intelligent channel selection apparatuses in accordance with embodiments of the present invention;

FIG. 3 is a block diagram of an intelligent channel selection apparatus in accordance with an embodiment of the present invention;

DESCRIPTION OF THE PREFERRED EMBODIMENTS

Figure 1:
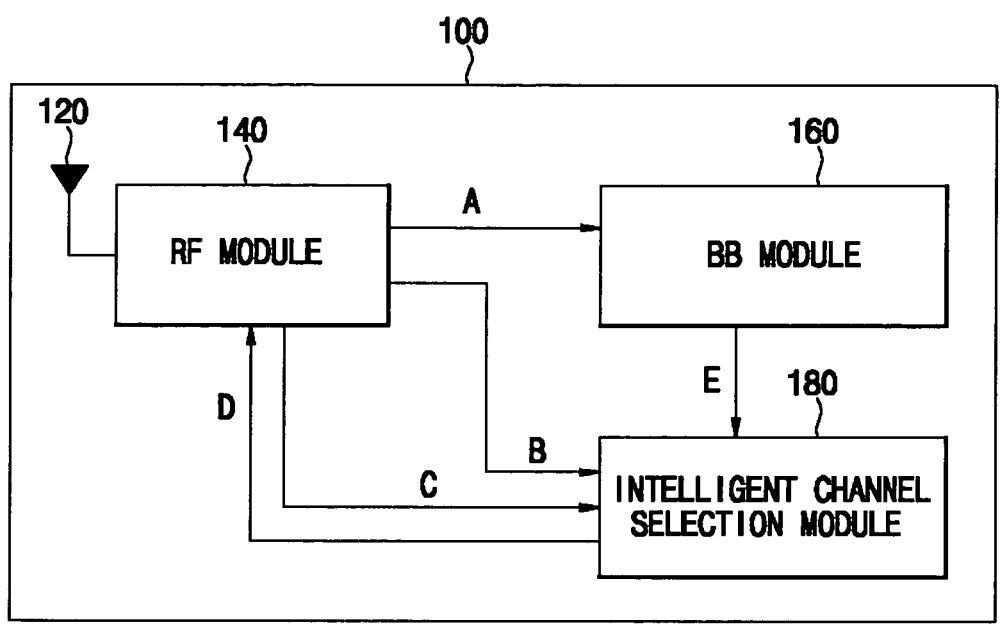
FIG. 1 is a block diagram showing a receiver equipped with an intelligent channel selection apparatus in accordance with an embodiment of the present invention.

Reference now should be made to the drawings, in which the same reference numerals are used throughout the different drawings to designate the same or similar components.

FIG. 1 is a block diagram schematically showing a receiver 100 equipped with an intelligent channel selection apparatus in accordance with an embodiment of the present invention. As shown in the drawing, the receiver 100 includes an antenna 120, a Radio Frequency (RF) module 140, a BaseBand (BB) module 160, and an intelligent channel selection apparatus 180.

The antenna 120 functions to receive an RF signal, the RF module 140 functions to convert the received RF signal into a BB signal, and the BB module 160 functions to demodulate the BB signal.

The intelligent channel selection apparatus 180 functions to intelligently select and assign a channel based on data output from the RF module 140 and the BB module 160.

In FIG. 1, "A" refers to the data input from the RF module 140 to the BB module 160, "B" refers to the data input from the RF module 140 to the intelligent channel selection apparatus 180, "C" refers to the data input from the RF module 140 to the intelligent channel selection apparatus 180, "D" refers to the data input from the intelligent channel selection apparatus to the RF module 140, and "E" refers to the data input from the BB module 160 to the intelligent channel selection apparatus 180.

Figure 2A:
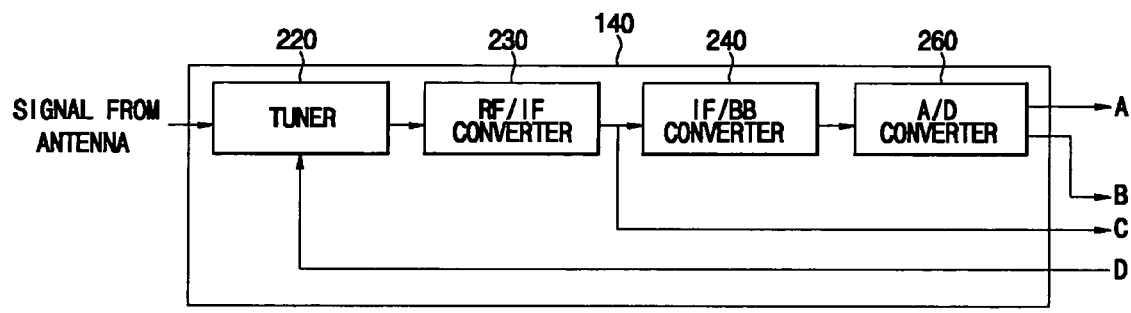

FIGS. 2a and 2b are block diagrams showing RF modules 140 in detail, respectively.

FIG. 2a is a block diagram showing the RF module 140 in the case where an Intermediate Frequency (IF) is used. In this case, the RF module 140 includes a tuner 220 selecting a channel, a RF/IF converter 230 converting a received RF signal into an IF signal, an IF/BB converter 240 converting the IF signal into a BB signal, and an Analog to Digital (A/D) converter 260 converting the BB signal into digital data.

FIG. 2b is a block diagram showing the RF module 140 in the case where an RF signal is directly converted into a BB signal without conversion to an IF signal. In this case, the RF module 140 includes a tuner 220 selecting a channel, a RF/BB converter 250 directly converting an RF signal, which was received from the tuner 220, into a BB signal, and an A/D converter 260 converting the BB signal into digital data.

In the case of FIG. 2a or 2b, the output "A" of the A/D converter 260 is fed to the BB module 160, and demodulated in the BB module 160.

The output B of the A/D converter 260 is fed to the intelligent channel selection apparatus 180, and will be used later to generate signal channel power data indicating received signal channel power.

The IF signal "C" of the RF/IF converter 230 or the output "C'" of the RF/BB converter 250 is fed to the intelligent channel selection apparatus 180, and will be used later to generate signal channel power data indicating the received signal channel power.

The output "D" of the intelligent channel selection apparatus is fed to the tuner 220 of the RF module 140 and helps the tuner 220 to select a channel.

Although the BB module 160 has not been illustrated in detail, the BB module 160 includes a demodulation unit (not shown) and functions to demodulate a BB signal.

FIG. 3 is a block diagram showing an intelligent channel selection apparatus 180 in accordance with an embodiment of the present invention. As shown in FIG. 3, the intelligent channel selection apparatus 180 of the present invention includes a channel power measurement unit 320 measuring received signal channel power through the use of at least one of the data "B," "C" and "C'" input from the RF module 140, and storing the measured channel power as signal channel power data, a channel list storage unit 340 arranging available channels through the use of data "E" input from the demodulation unit of the BB module 160, a channel data generation unit 360 generating data, which will be used to select a channel, based on the signal channel power data and the frequency offsets of channels of a channel list, and a channel selection unit 380 selecting the highest priority channel from the channels of the channel list based on the data for channel selection, and transmitting the data for channel selection to the tuner 220 of the RF module 140 as an output D.

In more detail, the channel power measurement unit 320 generates an RSSI signal indicating received channel power for each channel, and stores the RSSI signal as signal channel power data. That is, the RSSI signal is generated for a channel signal received from the antenna 120, and is provided to the channel selection data generation unit 360.

In order to measure channel power, data is received from the RF module 140. For example, at least one of outputs "B," and "C" or "C'" is input to the channel power measurement unit 320. The output "B" is the digital data into which a BB signal is converted by the A/D converter 260, the output "C" is an IF signal, and the output "C'" is a BB signal. Both of the outputs "C" and "C'" are all analog data.

In this case, the channel power measurement unit 320 can generate the RSSI signal in various ways. For example, an analog RSSI signal is generated by processing an input analog data "C" or "C'" through an analog RSSI processing unit, the analog RSSI signal is converted into a digital RSSI signal by A/D converter, and the digital RSSI signal is provided to the channel selection data generation unit 360. Alternatively, the input analog data "C" or "C'" is converted into digital data by A/D converter, a digital RSSI signal is generated by processing the digital data through a digital RSSI processing unit, and the digital RSSI signal is provided to the channel selection data generation unit 360.

The channel list storage unit 340 generates a channel list by arranging all channels available on a network to which the receiver 100 belongs, and stores the channel list. For example, all the channels unoccupied on the network layer of the demodulation unit (not shown) of the BB module 160 and the cell network to which the receiver 100 belongs are arranged and stored in a channel list.

The channel selection data generation unit 360 generates data for channel selection on the basis of signal channel power data measured in the channel power measurement unit 320 and the frequency offsets of channels of the channel list generated in the channel list storage unit 340. The data for channel selection may be various. In the embodiment of the present invention, the data for channel selection may be generated using, for example, Equation 1.

$$\omega_1 = \alpha_1(p_1-p_1) + \alpha_2(p_1-p_2) + \alpha_3(p_1-p_3) + \ldots + \alpha_k(p_1-p_k)$$

$$\omega_2 = \alpha_2(p_2-p_1) + \alpha_1(p_2-p_2) + \alpha_2(p_2-p_3) + \ldots + \alpha_{k-1}(p_2-p_k)$$

$$\omega_3 = \alpha_3(p_3-p_1) + \alpha_2(p_3-p_2) + \alpha_1(p_3-p_3) + \ldots + \alpha_{k-2}(p_3-p_k)$$

$$\omega_{k-1} = \alpha_{k-1}(p_{k-1}-p_1) + \alpha_{k-2}(p_{k-1}-p_2) + \alpha_{k-3}(p_{k-1}-p_3) + \ldots + \alpha_2(p_{k-1}-p_k)$$

$$\omega_k = \alpha_k(p_k-p_1) + \alpha_{k-1}(p_k-p_2) + \alpha_{k-2}(p_k-p_3) + \ldots + \alpha_1(p_k-p_k) \quad (1)$$

In Equation 1, $\omega_k$ is the sum of the differences between own received signal channel power and the power of interferers, including frequency offset parameter contribution with respect to each channel number. Furthermore, $p_k$ represents received signal channel power $\alpha_k$ is a weighting parameter, including a frequency offset factor, with respect to each channel number $\alpha_k$ is expressed by $\rho(k-1)f_{ch}$ where k is a channel number, $\rho$ is a kind of proportional coefficient normalized with respect to the contribution of a frequency offset and the contribution of received signal channel power, and $f_{ch}$ is the frequency of a corresponding channel. Substantially, $\rho$ can be expressed by a function of interferer attenuation related to the selectivity of the receiver.

The following Equation 2 is obtained by converting the data of Equation 1 into a Channel Selection Assignment Matrix (CSAM) $W_k$.

$$W_k = \begin{bmatrix} 0 & \alpha_2(p_1-p_2) & \alpha_3(p_1-p_3) & \ldots & \alpha_k(p_1-p_k) \\ \alpha_2(p_2-p_1) & 0 & \alpha_2(p_2-p_3) & \ldots & \alpha_{k-1}(p_2-p_k) \\ \alpha_3(p_3-p_1) & \alpha_2(p_3-p_2) & 0 & \ldots & \alpha_{k-2}(p_3-p_k) \\ & & \ldots & & \\ \alpha_{k-1}(p_{k-1}-p_1) & \alpha_{k-2}(p_{k-1}-p_2) & \alpha_{k-3}(p_{k-1}-p_3) & \ldots & \alpha_2(p_{k-1}-p_k) \\ \alpha_k(p_k-p_1) & \alpha_{k-1}(p_k-p_2) & \alpha_{k-2}(p_k-p_3) & \ldots & 0 \end{bmatrix} \quad (2)$$

When the data for channel selection, for example, the CSAM data $W_k$, is generated as described above, the channel selection unit 380 selects a highest priority channel from the channels of the channel list based on the data for channel selection. A channel is not selected simply using signal channel power, for example, an RSSI signal, but is selected based on the CSAM data with frequency offsets taken into consideration. Information on the channel selected as described above is transmitted to the tuner 220 of the RF module 140 and allows a corresponding channel to be used.

Figure 4:
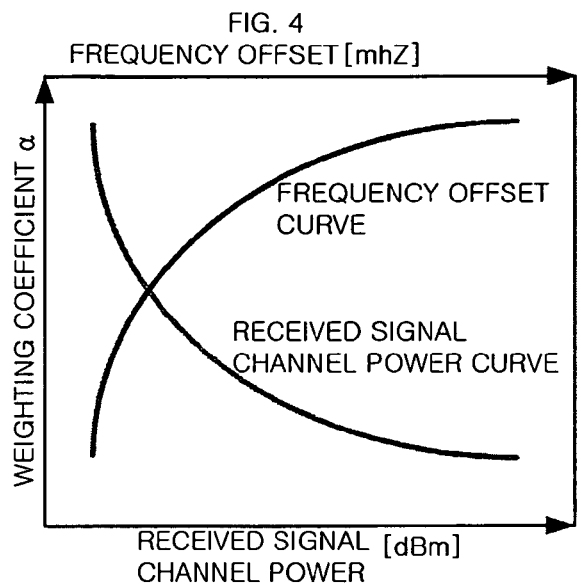
FIG. 4 is a graph showing the variations of weighting coefficient α according to frequency offsets and received signal channel power in general communication systems.

FIG. 4 is a graph showing the variations of a weighting coefficient α according to frequency offsets and received signal channel power in general communication systems. As shown in FIG. 4, the weighting coefficient α increases as the frequency offset increases, while the weighting coefficient α decreases as the received channel power increases. In brief, it can be known that the effect of the frequency offset is directly proportional to the effect of the received channel power.

Figure 5:
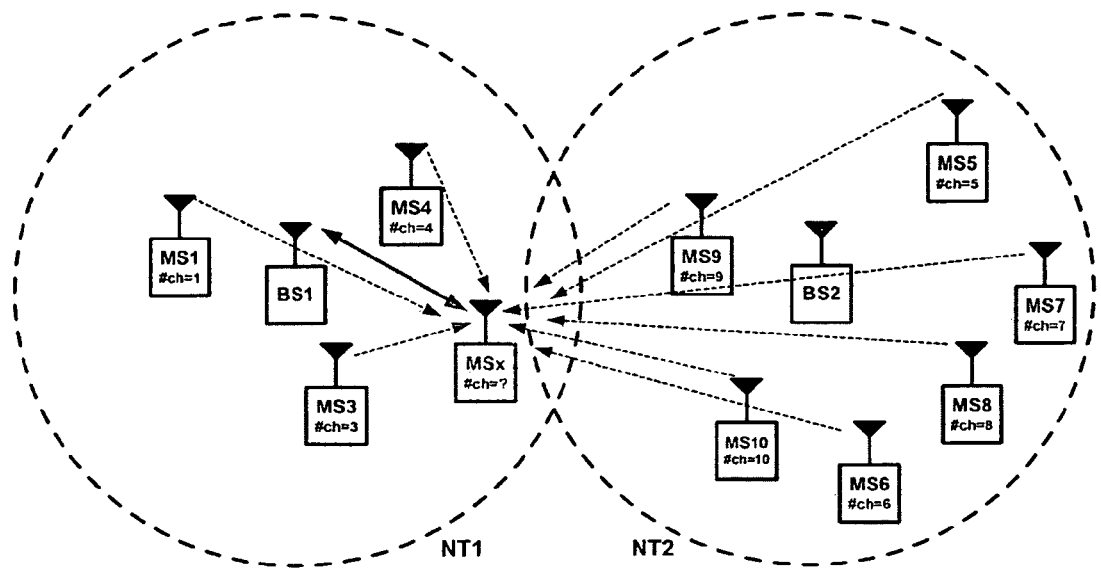
FIG. 5 is a diagram showing the circumstances of channel selection/assignment between communication terminals in various communication systems.

FIG. 5 is a diagram showing the circumstances of channel selection/assignment between communication terminals in various communication systems. As shown in FIG. 5, in a cell network NT1, a base station BS1 and mobile stations MS1, MS3, MS4 and MSx exist, and in a cell network NT2, a base station BS2 and mobile stations MS5 to MS10 exist. Each of the mobile stations communicates with the base station BS1 or BS2 through a corresponding channel. For example, the mobile station MS1 communicates with the base station BS1 or BS2 through channel No. 1 (#ch=1), and the mobile station MS9 communicates with the base station BS1 or BS2 through channel No. 9 (#ch=9).

In the case where a channel is selected and assigned for the mobile station MSx located in the cell network NT1, one channel is selected from the channels of the ISM-band and is assigned to the mobile station MSx under the circumstances in which various interferers belonging to the cell network NT1 and the cell network NT2 exist.

Figure 6:
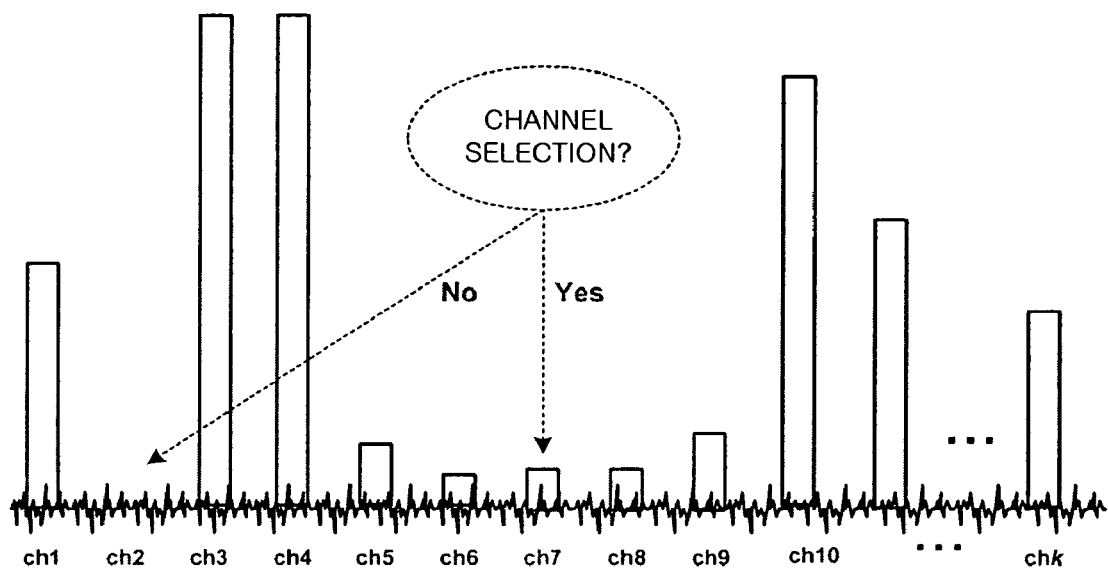
FIG. 6 is a graph showing signal channel power for channel selection in the channel selection/assignment circumstances of FIG. 5.

FIG. 6 is a graph showing signal channel power for channel selection in the channel selection/assignment circumstances of FIG. 5. As shown in FIG. 6, when signal channel power is represented for channels available to the mobile station MSx, it can be known that signal channel power is lowest for channel No. 2. For example, when the DCS scheme disclosed in Razavilar et al.'s patent application is used, the channel No. 2 having the lowest channel power is assigned to the mobile station MSx. However, the DCS scheme disclosed in Razavilar et al.'s patent application does not consider frequency offsets at all. In particular, when the influence of the surrounding interferers is considered, the channel selection increases the minimum detectable signal level of the receiver and power consumption due to the IMD effects caused by stronger interferers in surrounding channels and reciprocal mixing effects. Of the channels shown in FIG. 4, channel No. 7 ch7 selected according to the intelligent channel selection of the present invention, for example, based on a calculated CSAM, with both frequency offsets and channel power taken into consideration, is assigned to the mobile station MSx as a communication channel.

Figure 7:
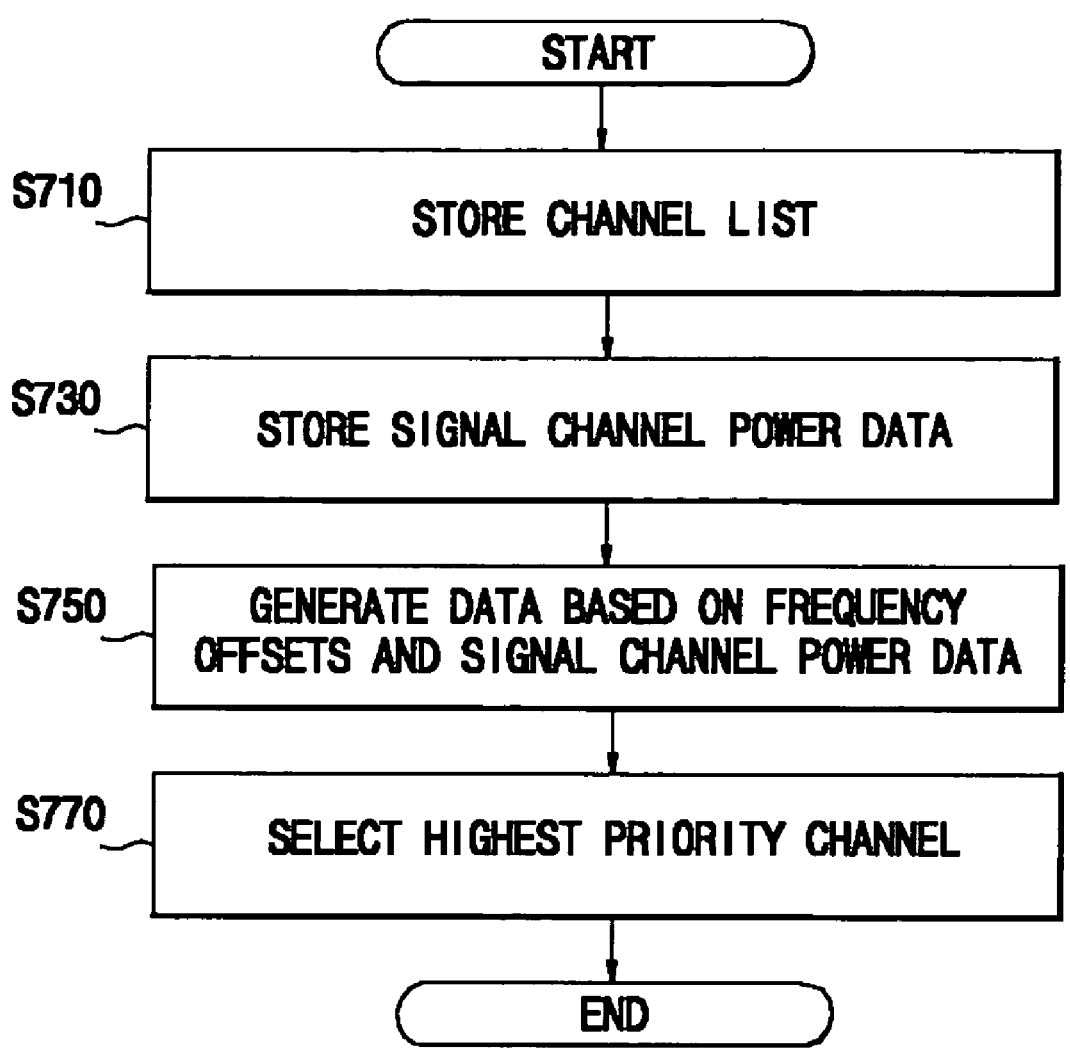
FIG. 7 is a flowchart showing an intelligent channel selection method in accordance with an embodiment of the present invention.

FIG. 7 is a flowchart showing an intelligent channel selection method in accordance with the present invention.

A plurality of available channels are arranged and stored in a channel list at step S710. As described above, for example, all the channels unoccupied on the network layer of the demodulation unit (not shown) of the BB module 160 and the cell network to which the receiver 100 belongs are arranged, and stored in a channel list.

The received signal channel power is measured for the plurality of available channels and stored as signal channel power data at step S730. At this step, for example, an RSSI signal indicating received channel power is generated for each channel, and is stored as signal channel power data.

Data for channel selection is generated based on the signal channel power data and the frequency offsets of the channels of the channel list at step S750. This step generates, for example, the above-described CSAM data.

Thereafter, the highest priority channel is selected from the channels of the channel list based on the data for channel selection at step S770. The priority may be set to allow a channel having the highest CSAM value to be selected.

With the above-described steps, the intelligent channel selection method of the present invention can be implemented.

Figure 8:
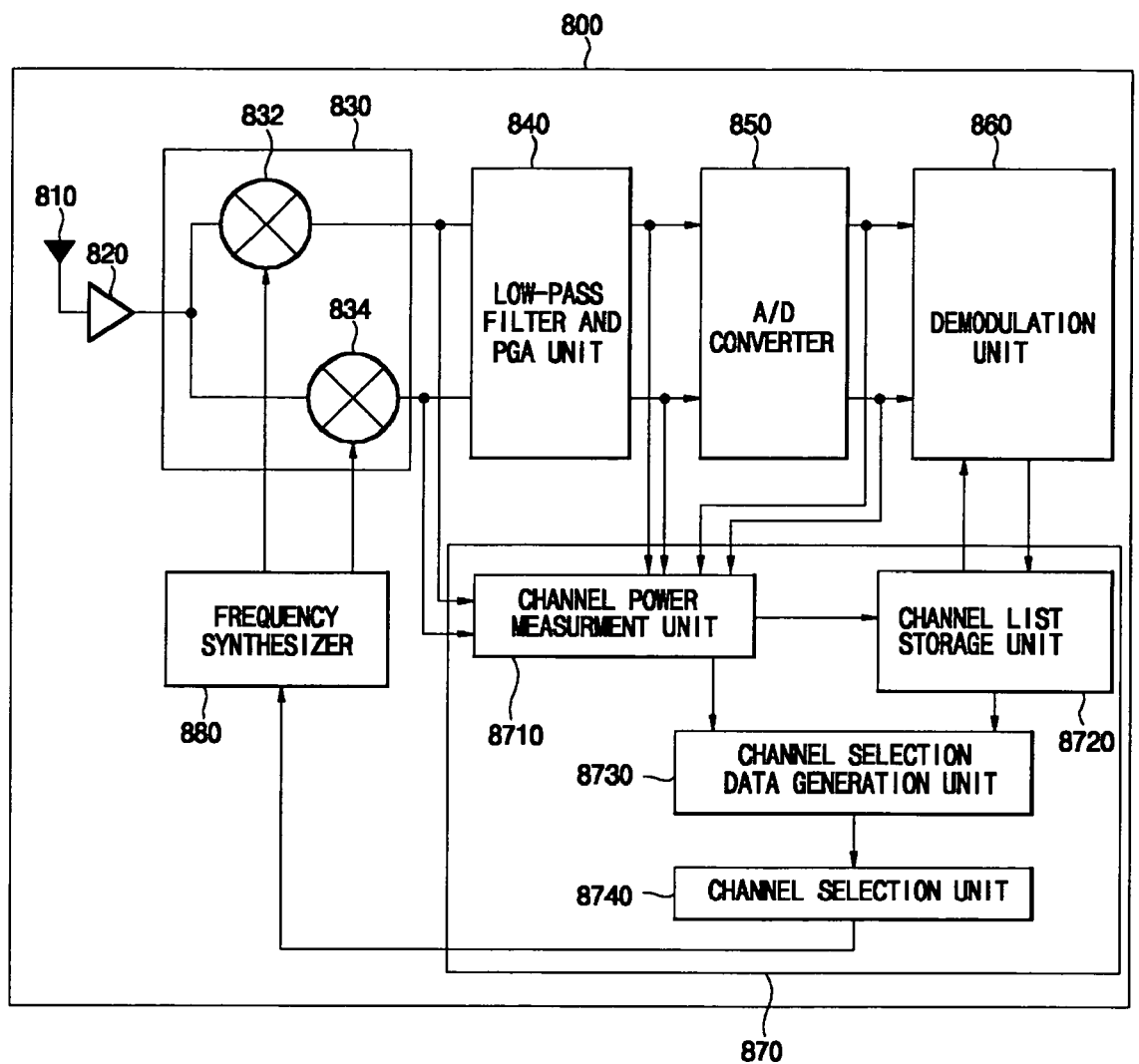
FIG. 8 is a block diagram of a receiver equipped with an intelligent selection apparatus in accordance with an embodiment of the present invention.

FIG. 8 is a block diagram showing an example of a receiver 800 equipped with the intelligent channel selection apparatus in accordance with the present invention. As shown in FIG. 8, the receiver 800 includes an antenna 810, a low noise amplifier 820, a mixer 830, a low-pass filter and Programmable Gain Amplifier (PGA) processing unit 840, an A/D converter 850, a demodulation unit 860, an intelligent channel selection apparatus 870 and a frequency synthesizer 880.

The intelligent channel selection apparatus 870 includes a RSSI processing unit 8710 measuring received signal channel power and outputting an RSSI signal, a channel list storage unit 8720 arranging a plurality of available channels and storing the available channels as a channel list, a channel selection data generation unit 8730 generating data for channel selection based on the signal channel power data and the frequency offsets of the channels of the channel list, and a channel selection unit 8740 selecting a highest priority channel from the channels of the channel list based on the data for channel selection, and controlling the frequency synthesizer to generate the frequency of the selected channel.

The antenna 810 functions to receive an RF signal. The low noise amplifier 820 functions to amplify the RF signal received by the antenna 810, in particular, to perform amplification to minimize noise that is generated during an amplification process. The mixer 830 functions to mix the signal, which has been amplified by the low noise amplifier, with the output frequency of the frequency synthesizer 880, and may include an I-mixer 832 and an Q-mixer 833 mixing I- and Q-signals with the output frequency, respectively. The low-pass filter and PGA unit 840 functions to perform low-pass filtering on the output signal of the mixer 830 and programmable gain amplification on the filtered signal.

The A/D converter 850 functions to convert the output signals of the low-pass filter and PGA unit 840 into digital data. The demodulation unit 860 functions to demodulate the output signal of the A/D converter 150.

The frequency synthesizer 880 functions to generate a plurality of frequencies.

The intelligent channel selection apparatus 870 is described in detail below. The channel power measurement unit 8710 functions to generate signal channel power data, for example, an RSSI signal, for each channel. In this case, the channel power measurement unit 8710 may receive at least one of the output signals of the mixer 830, the low-pass filter and PGA unit 840 and the A/D converter 850, and generate the RSSI signal. Since the output data of the mixer 830 or the low-pass filter and PGA unit 840 is analog data, the channel power measurement unit 8710 may generate an analog RSSI signal by processing input analog data using an analog RSSI processing device and generate a digital RSSI signal by A/D conversion, or convert input analog data by A/D conversion and generate a digital RSSI signal by processing the obtained digital signal using a digital RSSI processing device. In some way, a digital RSSI signal is generated. To this end, the channel power measurement unit 8710 may additionally include an A/D converter for converting input analog data into digital data, although not shown in the drawings.

The intelligent channel selection apparatus 180 functions to select a channel while considering basic data, such as RSSI signals and frequency offsets.

The descriptions of the channel list storage unit 8720, the channel selection data generation unit 8730 and the channel selection unit 8740 are replaced with the above description of the intelligent channel selection apparatus having been made with reference to FIG. 3.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. For example, the present invention may be constructed in such a way that the intelligent channel selection apparatus of the present invention is included in the BB module.

As described above, the present invention provides an intelligent channel selection apparatus, which is capable of reducing the influence of interferers, thus reducing power consumption as well as a minimum detectable signal.

What is claimed is:

1. An intelligent channel selection apparatus against various interferers in wireless communication systems, comprising:
    a channel power measurement unit measuring received signal channel power of a plurality of available channels and storing the received signal channel power as channel power data;
    a channel list storage unit arranging the plurality of available channels and storing the plurality of available channels in a channel list;
    a channel selection data generation unit generating data for channel selection based on the signal channel power data and frequency offsets of channels of the channel list; and
    a channel selection unit selecting a highest priority channel from the channels of the channel list based on the data for channel selection, wherein:
    the data for channel selection is a Channel Selection Assignment Matrix (CSAM) comprising received signal channel powers and weighting parameters with frequency offsets taken into consideration according to the respective channels; and the channel selection data generation unit calculates and stores the CSAM.

2. The intelligent channel selection apparatus as set forth in claim 1, wherein:

the CSAM $W_k$ is expressed by $$W_k = \begin{bmatrix} 0 & \alpha_2(p_1-p_2) & \alpha_3(p_1-p_3) & \dots & \alpha_k(p_1-p_k) \\ \alpha_2(p_2-p_1) & 0 & \alpha_2(p_2-p_3) & \dots & \alpha_{k-1}(p_2-p_k) \\ \alpha_3(p_3-p_1) & \alpha_2(p_3-p_2) & 0 & \dots & \alpha_{k-2}(p_3-p_k) \\ & & \dots & & \\ \alpha_{k-1}(p_{k-1}-p_1) & \alpha_{k-2}(p_{k-1}-p_2) & \alpha_{k-3}(p_{k-1}-p_3) & \dots & \alpha_2(p_{k-1}-p_k) \\ \alpha_k(p_k-p_1) & \alpha_{k-1}(p_k-p_2) & \alpha_{k-2}(p_k-p_3) & \dots & 0 \end{bmatrix}$$

where k is a natural number indicating a channel number, $p_1$ to $p_k$ represent received signal channel power for respective channels, and $\alpha_1$ to $\alpha_k$ are weighting parameters with frequency offsets taken into consideration according to the respective channels.

3. The intelligent channel selection apparatus as set forth in claim 2, wherein $\alpha_1$ to $\alpha_k$ are expressed by $\alpha_i = \rho(i-1)f_{ch}$ where i is a natural number equal to or larger than 1 and equal to or smaller than k, $\rho$ is a proportional coefficient normalized with respect to a contribution of a frequency offset and a contribution of received signal channel power, and $f_{ch}$ is a frequency of a corresponding channel.

4. The intelligent channel selection apparatus as set forth in claim 1, wherein the signal channel power data is Received Signal Strength Indication (RSSI) signals.

5. An intelligent channel selection method against various interferers in a wireless communication system, comprising:

arranging a plurality of available channels and storing the plurality of available channels in a channel list;

measuring received channel power with respect to the plurality of available channels and storing the received signal channel power as signal channel power data;

generating data for channel selection based on the signal channel power and frequency offsets of channels of the channel list; and selecting a highest priority channel from the channels of the channel list based on the data for channel selection, wherein the data for channel selection is a Channel Selection Assignment Matrix (CSAM) comprising received signal channel powers and weighting parameters with frequency offsets taken into consideration according to the respective channels.

6. The intelligent channel selection method as set forth in claim 5, wherein the CSAM $W_k$ is expressed by $$W_k = \begin{bmatrix} 0 & \alpha_2(p_1-p_2) & \alpha_3(p_1-p_3) & \dots & \alpha_k(p_1-p_k) \\ \alpha_2(p_2-p_1) & 0 & \alpha_2(p_2-p_3) & \dots & \alpha_{k-1}(p_2-p_k) \\ \alpha_3(p_3-p_1) & \alpha_2(p_3-p_2) & 0 & \dots & \alpha_{k-2}(p_3-p_k) \\ & & \dots & & \\ \alpha_{k-1}(p_{k-1}-p_1) & \alpha_{k-2}(p_{k-1}-p_2) & \alpha_{k-3}(p_{k-1}-p_3) & \dots & \alpha_2(p_{k-1}-p_k) \\ \alpha_k(p_k-p_1) & \alpha_{k-1}(p_k-p_2) & \alpha_{k-2}(p_k-p_3) & \dots & 0 \end{bmatrix}$$

where k is a natural number indicating a channel number, $p_1$ to $p_k$ represent received signal channel power for respective channels, and $\alpha_1$ to $\alpha_k$ are weighting parameters with frequency offsets taken into consideration according to the respective channels.

7. The intelligent channel selection apparatus as set forth in claim 6, wherein $\alpha_1$ to $\alpha_k$ are expressed by $\alpha_i = \rho(i-1)f_{ch}$ where i is a natural number equal to or larger than 1 and equal to or smaller than k, $\rho$ is a proportional coefficient normalized with respect to a contribution of a frequency offset and a contribution of received signal channel power, and $f_{ch}$ is a frequency of a corresponding channel.

8. The intelligent channel selection apparatus as set forth in claim 5, wherein the signal channel power data is RSSI signals.

9. A receiver for wireless communication systems having an antenna, a low noise amplifier amplifying a radio signal received from the antenna, a frequency synthesizer, a mixer mixing a signal amplified by the low noise amplifier and an output frequency of the frequency synthesizer, a low-pass filter and Programmable Gain Amplifier (PGA) unit performing low-pass filtering on an output signal of the mixer and programmable gain amplification on the filtered signal, an Analog-to-Digital (A/D) converter converting an output signal of the low-pass filter and PGA unit, a demodulation unit demodulating an output signal of the A/D converter, and an intelligent channel selection apparatus performing channel selection, the intelligent channel selection apparatus comprising:

a channel power measurement unit measuring received signal channel power of a plurality of available channels and storing the received signal channel power as channel power data;

a channel list storage unit arranging the plurality of available channels and storing the plurality of available channels in a channel list;

a channel selection data generation unit generating data for channel selection based on the signal channel power data and frequency offsets of channels of the channel list; and a channel selection unit selecting a highest priority channel from the channels of the channel list based on the data for channel selection, wherein:

the data for channel selection is a Channel Selection Assignment Matrix (CSAM) comprising received signal channel powers and weighting parameters with frequency offsets taken into consideration according to the respective channels.

10. The receiver as set forth in claim 9, wherein the signal channel power data is RSSI signals.

11. The receiver as set forth in claim 10, wherein:

the channel power measurement unit receives an output signal from the mixer or the low-pass filter and PGA unit and outputs an RSSI signal as signal channel power data in such a way as to generate an analog RSSI signal through processing of the received output signal of the mixer or the low-pass filter and PGA unit, convert the analog RSSI signal into a digital RSSI signal through A/D conversion, and output the digital RSSI signal as the signal channel power data; and the channel power measurement unit further comprises a second A/D converter for converting the analog RSSI signal into the digital RSSI signal.

12. The receiver as set forth in claim 10, wherein:

the channel power measurement unit receives at least one of output signals of the mixer, the low-pass filter and PGA unit and the A/D converter, and outputs a digital RSSI signal as signal channel power data; and the channel power measurement unit further comprises a third A/D converter for converting the output signal of the mixer or low-pass filter and PGA unit into digital data when generating the RSSI signal based on the output signal of the mixer or the low-pass filter and PGA unit.

13. The receiver as set forth in claim 9, wherein the CSAM $W_k$ is expressed by $$W_k = \begin{bmatrix} 0 & \alpha_2(p_1-p_2) & \alpha_3(p_1-p_3) & \ldots & \alpha_k(p_1-p_k) \\ \alpha_2(p_2-p_1) & 0 & \alpha_2(p_2-p_3) & \ldots & \alpha_{k-1}(p_2-p_k) \\ \alpha_3(p_3-p_1) & \alpha_2(p_3-p_2) & 0 & \ldots & \alpha_{k-2}(p_3-p_k) \\ & & \ldots & & \\ \alpha_{k-1}(p_{k-1}-p_1) & \alpha_{k-2}(p_{k-1}-p_2) & \alpha_{k-3}(p_{k-1}-p_3) & \ldots & \alpha_2(p_{k-1}-p_k) \\ \alpha_k(p_k-p_1) & \alpha_{k-1}(p_k-p_2) & \alpha_{k-2}(p_k-p_3) & \ldots & 0 \end{bmatrix}$$

where k is a natural number indicating a channel number, $p_1$ to $p_k$ represent received signal channel power for respective channels, and $\alpha_1$ to $\alpha_k$ are weighting parameters with frequency offsets taken into consideration according to the respective channels.

14. The receiver as set forth in claim 13, wherein $\alpha_1$ to $\alpha_k$ are expressed by $\alpha_i = \rho(i-1)f_{ch}$ where i is a natural number equal to or larger than 1 and equal to or smaller than k, $\rho$ is a proportional coefficient normalized with respect to a contribution of a frequency offset and a contribution of received signal channel power, and $f_{ch}$ is a frequency of a corresponding channel.

* * * * *